United States Patent
Rockwell et al.

(10) Patent No.: US 10,569,316 B2
(45) Date of Patent: Feb. 25, 2020

(54) TWO-STAGE REMEDIATION OF PARTICULATE MATERIAL

(71) Applicant: ExxonMobil Research and Engineering Company, Annandale, NJ (US)

(72) Inventors: Gregory P. Rockwell, Sarnia (CA); Sean M. Mercer, Sarnia (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/624,876

(22) Filed: Jun. 16, 2017

(65) Prior Publication Data
US 2018/0009014 A1 Jan. 11, 2018

Related U.S. Application Data

(60) Provisional application No. 62/359,875, filed on Jul. 8, 2016.

(51) Int. Cl.
*B09C 1/06* (2006.01)
*F23G 7/00* (2006.01)
(Continued)

(52) U.S. Cl.
CPC .............. *B09C 1/06* (2013.01); *B09B 3/0083* (2013.01); *B09B 5/00* (2013.01); *B09C 1/00* (2013.01);
(Continued)

(58) Field of Classification Search
CPC combination set(s) only.
See application file for complete search history.

(56) References Cited

U.S. PATENT DOCUMENTS 5,200,033 A * 4/1993 Weitzman ............. B09B 3/0041
                                                        159/16.1
5,658,094 A * 8/1997 Clawson .................... B09C 1/06
                                                       110/236
(Continued)

FOREIGN PATENT DOCUMENTS

WO      1995030453 A1    11/1995
WO      2014/093469 A2    6/2014

OTHER PUBLICATIONS

The International Search Report and Written Opinion of PCT/US2017/037858 dated Sep. 19, 2017.
Pal et al., Application Guide for Thermal Desorption Systems, Naval Facilities Engineering Service Center, 1998, Section 2.1, TR-2090ENV.

*Primary Examiner* — Sean D Andrish
(74) *Attorney, Agent, or Firm* — Liza Negron; Andrew T. Ward (57) ABSTRACT

Methods and systems are provided for two-stage treatment of contaminated particulate material, such as soil, sediment, and/or sludge. The methods and systems utilize a thermal desorption process combined with a smoldering combustion process. The contaminated particulate material is first exposed to thermal desorption at high temperatures (e.g., greater than 150° C.) to form a heated contaminated particulate material. Next, a smoldering combustion process is initiated by introducing a combustion-supporting gas. The combined process can take place in the same or different treatment units.

19 Claims, 3 Drawing Sheets

(51) Int. Cl.
*F23G 5/027* (2006.01)
*F23G 7/14* (2006.01)
*B09B 5/00* (2006.01)
*B09C 1/08* (2006.01)
*B09C 1/00* (2006.01)
*F23G 5/24* (2006.01)
*B09B 3/00* (2006.01)

(52) U.S. Cl.
CPC ................ *B09C 1/08* (2013.01); *F23G 5/027* (2013.01); *F23G 5/24* (2013.01); *F23G 7/001* (2013.01); *F23G 7/14* (2013.01); *F23G 2201/301* (2013.01); *F23G 2201/302* (2013.01); *F23G 2201/40* (2013.01)

(56) References Cited

U.S. PATENT DOCUMENTS

| | | | |
|---|---|---|---|
| 7,019,190 B1* | 3/2006 | Lucas | B09C 1/06 110/203 |
| 8,037,617 B2 | 10/2011 | Kossowan | |
| 2003/0228196 A1* | 12/2003 | Satchwell | B09B 3/00 405/128.5 |
| 2012/0272878 A1* | 11/2012 | Grant | F23C 99/006 110/346 |
| 2013/0310624 A1* | 11/2013 | Thomas | A62D 3/40 588/321 |
| 2014/0241806 A1 | 8/2014 | Rockwell et al. | |

* cited by examiner

Prior Art

Figure 3

TWO-STAGE REMEDIATION OF PARTICULATE MATERIAL

CROSS REFERENCE TO RELATED APPLICATION

This application relates and claims priority to U.S. Provisional Patent Application No. 62/359,875, filed on Jul. 8, 2016, the disclosure of which is specifically incorporated herein by reference in its entirety.

FIELD OF THE INVENTION

The presently disclosed subject matter relates to the remediation of soil contaminated with organic compounds including but not limited to hydrocarbons. In particular, the presently disclosed subject matter relates to a two-stage process for the application of thermal desorption and smoldering combustion to remediate contaminated particulate materials.

BACKGROUND OF THE INVENTION

Contamination of particulate materials (e.g., soils, sediments, sludges, or muds) can arise from hazardous materials being spilled, leaked, discharged, co-processed, or buried at a site, or from intrusion of contaminants from offsite sources. As an example, leaking underground storage tanks have contaminated the soil at sites with petroleum hydrocarbons and lead, and caused similar contamination of adjacent sites through migration in the subsurface. In general, contaminants which may be found in particulate materials include liquids, which may have associated vapors, and solids. Contaminants may be physically or chemically attached to particles, or may be present as a separate phase between particles, such as non-aqueous phase liquids (NAPLs). Liquid contaminants include petroleum hydrocarbons, coal tars, and industrial solvents, while solid contaminants include salts, metals, and organic materials (e.g., explosives, pesticides).

Remediation of contaminated particulate materials implies the removal of contaminants and their impacts for the general protection of health and for the benefit of the environment. For example, remediation at former industrial ("brownfield") sites may be a prerequisite for redevelopment for residential, commercial, or new industrial use. Remediation is generally subject to an array of regulatory requirements, and also can be based on assessments of human health and ecological risks in light of planned future use.

Site remediation methods addressing contamination can be classified in general terms as: (1) ex situ methods in which the particulate material is displaced and treated or disposed of in a waste facility; and (2) in situ methods in which the particulate material remains in place for treatment. Stabilization, solidification, or containment, while not remediation methods in themselves, may also be used to prevent the contamination from becoming more widespread. Treatment methods for organic contaminants are numerous and varied, with examples including: thermal approaches like incineration, smoldering and thermal desorption; washing/flushing with aqueous solutions or organic solvents; bioremediation, in which microbial activity is stimulated to achieve enhanced biodegradation; and chemical oxidation, typically with an aqueous solution or gas.

Of the thermal remediation methods for particulate materials, incineration is generally the most effective for destroying organic contaminants due to the high temperatures achieved. However, high temperatures also have greater associated fuel costs and tend to degrade native properties of soils and sediments. Due to the range of wastes fed into incinerators, their emissions must also be carefully monitored and controlled (e.g., through temperature and filtration). Thermal desorption, in which organic contaminants are desorbed from particulate materials through the application of heat, is a leading alternative to incineration. Material that is evaporated off of the contaminated soil is collected outside the thermal desorption unit (also referred to as the "thermal desorber" or just "desorber" herein) and either condensed and disposed of or oxidized to its mineral constituents. After treatment, the soil can be returned to its native location.

The thermal desorption process is carried out in a non-combustive environment, although some localized combustion can occur in conventional processes. Combustion during thermal desorption is generally undesired in current practice because it poses an explosion hazard and could lead to regulatory classification as a form of incineration rather than separation. Some units will operate with an oxygen-deficient carrier gas (e.g., a flue gas or an inert gas) or at a vacuum to lower the risk of combustion. Limiting the combustibles in the particulate feed to the unit is also a common practice.

Thermal desorption is a cooler (usually 150-500° C.), less harsh treatment than incineration, but may be ineffective for particulate materials with certain textures (e.g., clays), high moisture contents (e.g., wet soils, sediments) or elevated levels of certain contaminants. The cooler operating temperatures can result in unsatisfactory performance (e.g., failure to remediate or excessive cost) for soils with low-volatility or tightly-bound organic contaminants. Such contaminants can include hydrocarbons heavier than C16 (depending on desorption temperature, treatment time and concentration) and polycyclic aromatic hydrocarbons (PAHs). These limitations pose performance challenges for soils impacted by heavier sources (e.g., diesel fuels, lubricating oils, bunker fuels, crude oils, coal tars).

The output from a thermal desorption process is a dry, hot particulate material with relatively small aggregates. Larger clumps of particulate entering the desorber tend to break down through drying and agitating during treatment, resulting in a product that is closer to a sand or powder. This product is quenched with water to provide cooling, reduce dust and restore more natural properties (e.g., aggregate structure, moisture).

Smoldering, which is a flameless combustion process, is a more recent approach for remediating particulate materials containing organic contamination. In a smoldering remediation process a self-sustaining, flameless combustion front is propagated in a contaminated soil (either in situ or ex situ) resulting in the mineralization of hydrocarbon contaminants. Smoldering differs from flaming combustion as oxidation reactions occur on the surface of a solid or liquid rather than in the gas phase. As the soil can act as an insulator, smoldering can be self-sustaining after ignition (i.e. no external heating is required) provided the soil has sufficient oxygen to maintain combustion and sufficient fuel content. Achieving self-sustaining combustion front propagation is a key feature of existing smoldering technologies and requires a self-sustaining threshold ("SST") of soil fuel content. The SST substantially limits the applicability of smoldering technologies for treating soils impacted by petroleum hydrocarbons, which often have insufficient fuel content in regions within the soil volume. In addition, the process of propagating a combustion front through soil by forced aeration inherently restricts existing smoldering technologies to soils with preferred properties (e.g., dry, sandy texture). Soils with higher levels of moisture or silt/clay are often untreatable or treatable only with low air supply rates that make the throughput inadequate for commercial use.

Smoldering may be sustained in a particulate material provided sufficient fuel is present. This process occurs naturally, for example, in underground peat fires. However, organic contaminants can also provide sufficient energy for self-sustaining smoldering combustion under the right conditions. Generally, these conditions include high enough contaminant concentrations, a supply of air, adequate retention of heat, and an initial source of heat to ignite the smoldering front. If these conditions are met, smoldering can be used as a process to remediate particulate materials, virtually eliminating all organic contaminants.

Smoldering combustion can be initiated by actively heating a small region of contaminated particulate material below the surface and introducing air once that region has reached ignition temperature (typically 200-500° C.). The heater may then be deactivated, while the air supply is maintained to sustain a smoldering front, which propagates through the bed of particulate material destroying contaminants. Provided there is sufficient fuel for the process in the particulate material, smoldering can be self-sustaining in the sense that no further active heating is required after ignition, as the contaminants themselves supply the heat required for their ongoing destruction.

As stated above, however, the fuel content of the contaminated soil is often inadequate to support propagation of a combustion front through the soil. It has been suggested to additize the soil with an organic fuel source, see U.S. Publication No. 2014/0241806 to Rockwell (incorporated herein in its entirety by reference), but this adds another cost to the remediation process, which is undesirable.

Additionally, the propagation of a combustion front in smoldering processes is slow as heat is transferred through the insulating particulate medium. This mechanism limits throughput to a fraction of that which may be achieved through thermal desorption, e.g., 5-10 tonnes/hour with smoldering versus 20-40 tonnes/hour with thermal desorption. Finally, current smoldering processes are carried out in non-homogeneous contaminated soils and require forced aeration to maintain oxygen levels sufficient for combustion. The heterogeneity of the soil bed (e.g., texture, moisture, compaction) and the heterogeneity of the fuel content in the soil bed tend to lead to uneven propagation of the combustion front in conventional smoldering processes. Regions of contaminated soil can be bypassed or inadequately treated as air flow and combustion occur along preferential pathways in the soil bed.

Remediation technologies are frequently benchmarked by cost to offsite disposal at a waste facility, which relocates contaminated particulate materials to an engineered site for long-term storage. Offsite disposal is often the most economical option for these materials and has a relatively low risk of failure in reaching regulatory criteria at a site. Except when transportation is impractical due to distance or quantity of material, few technologies can routinely compete with its combination of reliability and cost effectiveness. One of the most commonly employed alternatives to offsite disposal for organic contamination is bioremediation, which can cost roughly half the price. While bioremediation provides significant savings over offsite disposal, its application is generally restricted to particulate materials with relatively low levels of contamination, especially in the more refractory hydrocarbons (e.g., hydrocarbons heavier than C16 or PAHs). There is therefore a need for a cost-effective remediation technology that is effective when bioremediation cannot be applied.

SUMMARY OF THE INVENTION

In certain aspects, two-stage systems and processes for treating particulate materials containing organic contaminants are provided. In one aspect, the process includes removing an amount of contaminated particulate material from its location; transferring the contaminated particulate material to a thermal desorption unit; subjecting the contaminated particulate material to a thermal desorption process, wherein the thermal desorption process comprises; heating the contaminated particulate material to volatilize a portion of the organic contaminants and to form a preheated contaminated particulate material; collecting the volatilized organic contaminants outside of the thermal desorption unit; transferring the preheated contaminated particulate material to a smoldering combustion unit; subjecting the preheated contaminated particulate material to a smoldering combustion process, wherein the smoldering combustion process comprises; admitting the preheated contaminated particulate material to a smoldering combustion unit having an inlet for a contaminated particulate material and an outlet for a treated particulate material to be withdrawn from the unit; operating the smoldering combustion unit under conditions sufficient to ignite a smoldering combustion reaction, which creates gaseous combustion products; collecting the gaseous combustion products outside of the smoldering combustion unit; and withdrawing a treated particulate material from the outlet of the smoldering combustion unit.

In another aspect, the particulate material comprises at least one of a soil, sediment and sludge. Additionally, the organic contaminants may comprise hydrocarbon or chlorinated hydrocarbon or any other hydrocarbon within the soil. In another aspect, the thermal desorption portion of the process is typically operated at a temperature greater than 150° C., e.g. 300 to 500° C. Likewise, the smoldering combustion portion of the process is typically operated at a temperature greater than 150° C., e.g. 200 to 400° C.

In yet another aspect, operating the smoldering combustion unit under conditions sufficient to ignite a smoldering combustion reaction includes blowing the particulate material with combustion-supporting gas. In one aspect, the combustion-supporting gas is air. In another aspect, the combustion-supporting gas can be preheated.

In certain aspects, the smoldering combustion unit is a continuous smoldering system comprising a vertically aligned vessel wherein particulate material predominantly flows from top to bottom. In another aspect, the smoldering combustion unit comprises an enclosed conveyor along which particulate material is blown by one or more nozzles supplied with combustion-supporting gas. In yet another aspect, the smoldering combustion unit is a second thermal desorption unit or could even be the same structure as the thermal desorption unit. When the smoldering combustion unit is the same structure as the thermal desorption unit, in one aspect the thermal desorption unit may contain a spatial transition from the thermal desorption process to the smoldering combustion process along a direction of bulk transport of the particulate material.

In certain aspects, the smoldering combustion unit may include pressurized injection of the combustion-supporting gas. In cases where the smoldering combustion unit is the same structure as the thermal desorption unit, then this pressurized injection may take place at the conclusion of the thermal desorption process.

In yet another aspect, the smoldering combustion unit may comprise a fluidized bed reactor in which combustion-supporting gas fluidizes the particulate material.

Additionally, systems for two-stage treating of particulate materials containing organic contaminants are provided. In various aspects, the systems comprise a thermal desorption unit; and a smoldering combustion unit operatively coupled to the thermal desorption unit; wherein the smoldering combustion unit comprises; an enclosed structure; one or more pressurized gas injectors supplied with a combustion-supporting gas; an inlet for a contaminated particulate material; an outlet for withdrawing a treated particulate material; and a connection for collecting an exhaust gas.

In one aspect, the enclosed structure comprises a vertically aligned vessel wherein the contaminated particulate material predominantly flows from top to bottom. In another aspect, the enclosed structure comprises a conveyor. In yet another aspect, the enclosed structure may include a second thermal desorption unit or could even be the same structure as the thermal desorption unit. In another aspect, the enclosed structure is a fluidized bed reactor in which the combustion-supporting gas fluidizes the particulate material.

DETAILED DESCRIPTION

The process disclosed herein may be better understood from a description of both smoldering and conventional thermal desorption processes.

Thermal Desorption Unit

The U.S. EPA defines thermal desorption as follows: "Thermal desorption is a process that uses either indirect or direct heat exchange to heat organic contaminants to a temperature high enough to volatilize and separate them from a contaminated solid medium. Air, combustion [flue] gas, or an inert gas is used as the transfer medium for the vaporized components. Thermal desorption systems are physical separation processes that transfer contaminants from one phase to another. They are not designed to provide high levels of organic destruction, although the higher temperatures of some systems will result in localized oxidation or pyrolysis. Thermal desorption is not incineration, since the destruction of organic contaminants is not the desired result. The bed temperatures achieved and residence times used by thermal desorption systems will volatilize selected contaminants, but usually not oxidize or destroy them. System performance is usually measured by the comparison of untreated solid contaminant levels with those of the processed solids. The contaminated medium is typically heated to 300 to 1,000° F. [about 150 to 540° C.], based on the thermal desorption system selected." Pal et al., *Application Guide for Thermal Desorption Systems*, § 2.1, TR-2090-ENV, Naval Facilities Engineering Service Center (April 1998).

Figure 1:
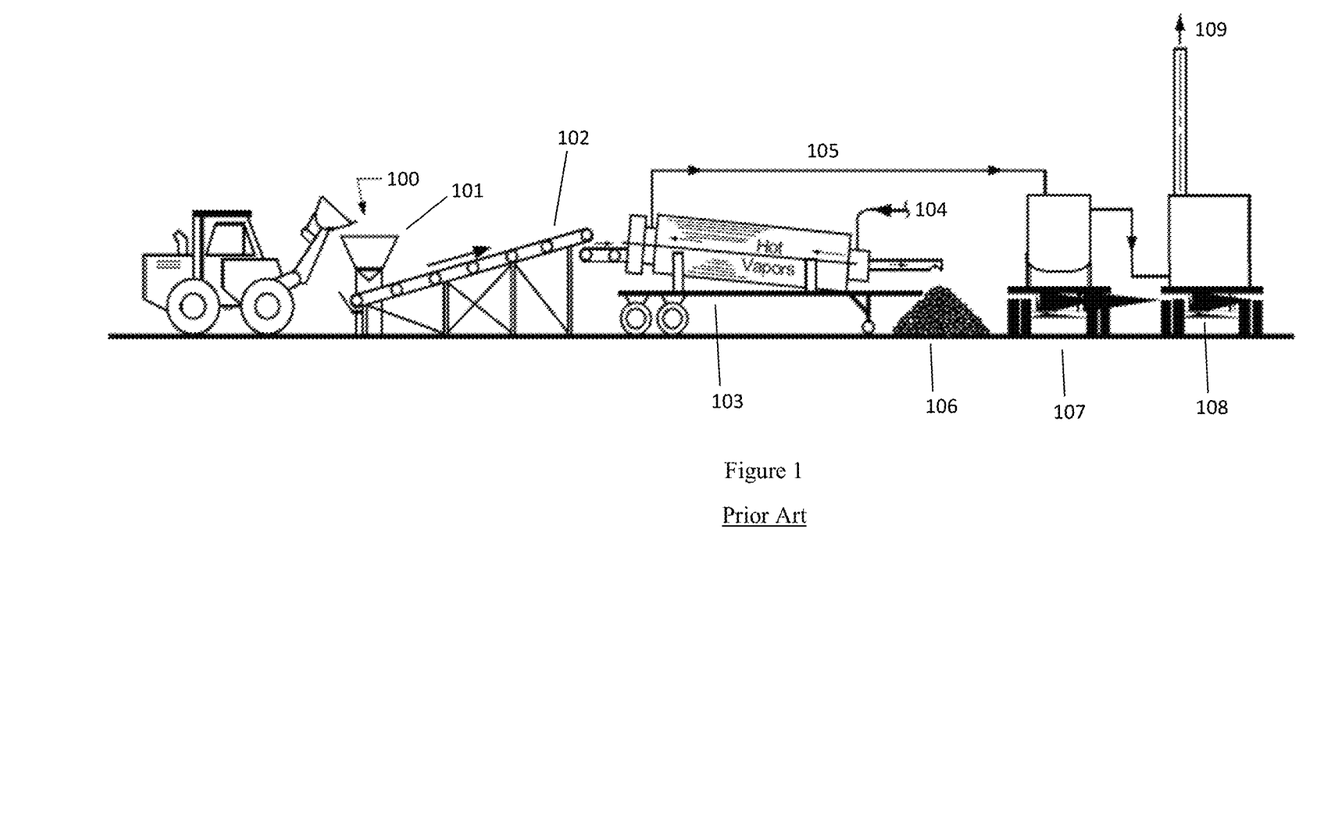
FIG. 1 is a schematic illustration of a conventional thermal desorption system for ex situ remediation of contaminated soil.

A schematic diagram of a conventional thermal desorption system is shown in FIG. 1. This configuration is provided for purposes of explanation only. It would be understood by persons of skill in the art that conventional thermal desorption processes can include batch or continuous feed, co-current or counter-current, and/or direct or indirect heating. Batch feed systems operate by accepting a discrete amount of material and can include mixing (e.g. rotary drums) or static systems. Continuous feed systems can operate continuously via conveyors and may also utilize rotating drums—usually operating at an incline.

Co-current or counter-current refers to the flow direction of gases. If the flow of gases follows the direction of the material going through the desorber, then it is considered to be a co-current desorption system. If the gases and soil flow in opposite directions, then it is considered a countercurrent desorption system. Thermal desorption units can be further classified as either direct-contact or indirect-contact. Direct-contact desorbers are designed to allow direct heat transfer between an open flame and the soil. These direct-contact systems are usually used for continuous-feed systems that use an inclined rotating drum. Soil is fed into one end of the drum, comes into proximity of an open flame, and exits the drum at the downstream end. Indirect-contact systems do not allow direct heat transfer between the flame and the soil (e.g., heat transfer to the soil occurs via a metal wall).

In reference to FIG. 1, contaminated particulate material (e.g., soil) 100 is excavated and fed into feed hopper 101. Soil 100 is then conveyed via conveyor 102 into rotary dryer 103. Within rotary dryer 103, soil 100 is heated to between 150 and 500° C. via heat source 104. Dryer 103 could rotate or operate using a conveyor system. Heat source 104 may be either a direct or indirect source of heat. The desorber is operated in an environment below the lower explosive limit (LEL) of the desorbed contaminants. LEL is the lowest concentration (percentage) of a gas or a vapor in air capable of producing a flash of fire in the presence of an ignition source. Oxygen concentrations in a thermal desorption process depend on the carrier gas (e.g., flue gas, inert gas, air) and vaporized contaminant and water levels, but are generally below those in ambient air (i.e., below ~21 vol %).

The thermal desorption unit of FIG. 1 operates in a counter-current manner, where volatized hydrocarbon contaminants are removed via vapor discharge line 105. The contaminants can be directed to a variety of post-treatment processes including bag house 107. Bag houses utilize a system of permeable bags, which collect small particulate matter. Gases entering a bag house may be cooled with a separate gas cooling system (not shown) for compatibility with the bag-house material. Gases exiting the bag house are subsequently treated using air cleaning unit 108. Depending on the characteristics and concentration of the contaminants that have been removed from the soil, air cleaning unit 108 may comprise one or more treatment processes. These treatment processes could include: a condensing step to collect and recover liquid hydrocarbon; an adsorption step where hydrocarbon is removed from the gas stream via adsorption onto a solid or liquid medium, such as activated carbon; and an afterburner, in which volatilized hydrocarbon is combusted. After passing through air cleaning unit 108, the treated gases are released to the atmosphere through discharge or exhaust stack 109. Remediated soil 106 exits the outlet of rotary dryer 103. In practice, the air cleaning unit may be located after the desorber but before the bag house. In addition, a wet scrubber may be located downstream of an afterburner to remove volatilized metals and acid gas (e.g., hydrochloric acid) from the combustion of chlorinated contaminants.

Smoldering Unit

Figure 2:
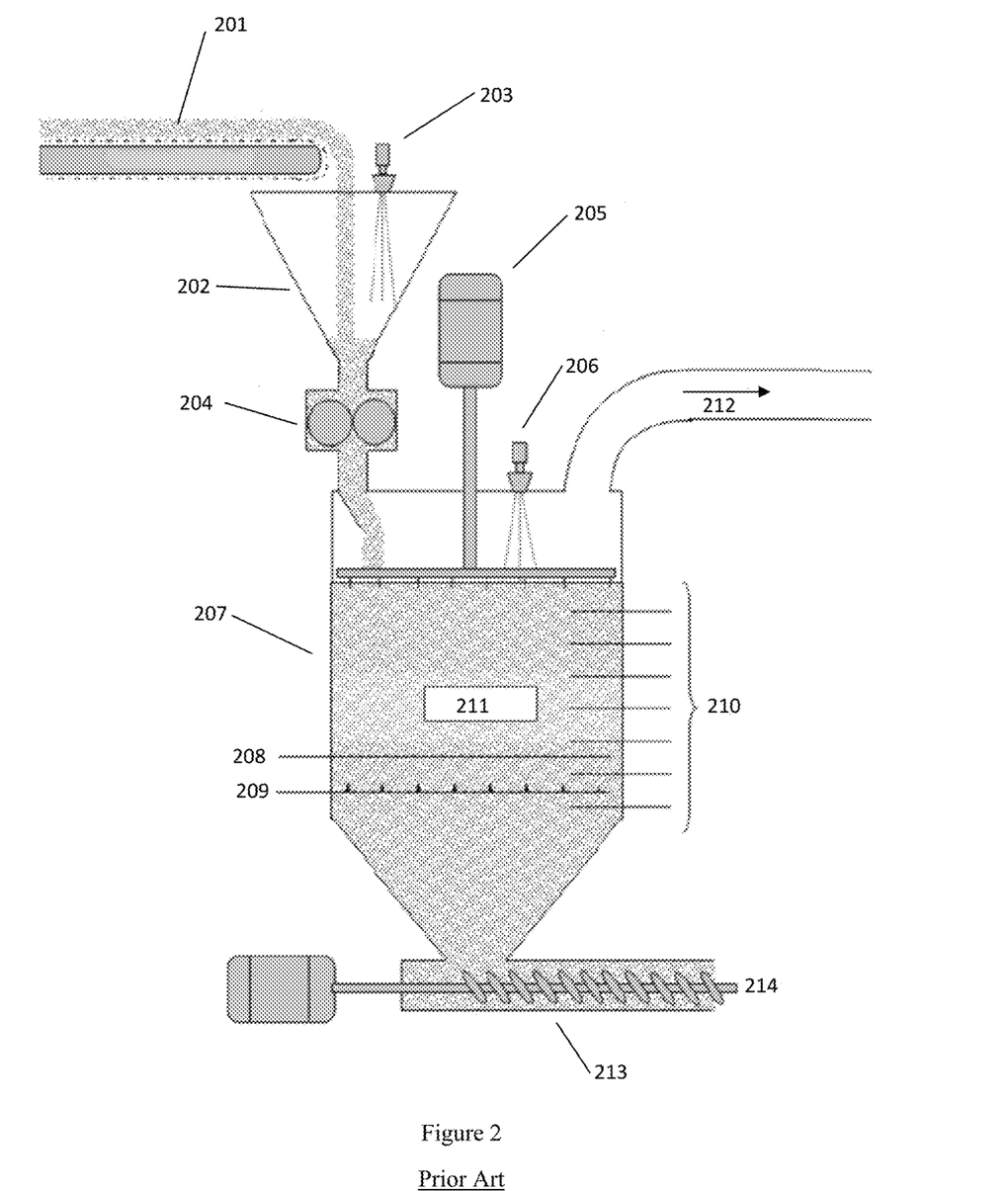
FIG. 2 is a schematic illustration of a continuous smoldering system for ex situ remediation of contaminated soil.

A schematic diagram of a continuous smoldering system for ex situ remediation of contaminated particulate materials is shown in FIG. 2. During operation of the system, a conveyor 201, which could be based on a belt or auger, delivers pretreated feed to a hopper 202. The pretreatment may include shredding, drying (possibly with heat recycled from the smoldering unit), dewatering (e.g., treating dredged sediments with a plate-and-frame filter press), removing large rocks or debris, homogenizing, mixing different feeds together, or mixing in a substance to enhance smoldering performance, e.g., a smoldering-promoting additive or a less combustible diluent. The level in the hopper is monitored by a sensor 203, which actuates the conveyor system when the feed in the hopper is below a preset level. Feed exiting the hopper passes through a shredder 204 to improve packing and air distribution before entering the open top of the smoldering vessel 207, which is configured for bottom-to-top front propagation. Inside the chamber, loaded feed is evenly distributed by a rake or plow system 205, and the loaded feed level is controlled using another sensor 206, which actuates the shredder.

The smoldering chamber has ports on the sides for air spargers 209, heating cables 208, and thermocouples 210. The air spargers are perforated pipes (perforated on the top side) located in a plane, typically near the bottom of the chamber. To prevent clogging, the perforations are capped with conical deflectors (not shown). The air spargers can sparge the vessel with air (oxygen concentration about 20%), but increased or decreased oxygen levels can be used to increase or decrease the rate of combustion. The heating cables lie in a plane somewhat above the air spargers, and may be retractable since they are only required for ignition. The thermocouples are vertically distributed throughout the treatment bed to monitor temperatures during both the initial heating stage and continuous smoldering process so as to monitor the position and progress of the smoldering front 211; the thermocouples may also be distributed radially to determine the temperatures across the bed. If bulk solid flow through the system disturbs the thermocouples, an alternative arrangement would be in a bundle along the vertical axis of the reactor, passing through the shaft of the rake or plow system.

The smoldering chamber 207 has two more external connections. At the top of the chamber, a pipe 211 is attached for collecting the off-gas for treatment to remove noxious gases and any solid particulates to comply with air emission standards. The pipe is desirably under negative pressure to draw the gas in. The gases may subsequently pass through a water knockout tank and volatile organic compound (VOC) removal system (e.g., a carbon adsorption bed or burner). The second connection is located at the bottom, where the chamber tapers as a mass-flow funnel, which terminates over a channel or pipe housing an auger or screw conveyor 213 for removing smoldered product 214. The combination of a mass-flow funnel with an auger or screw conveyor is an established system in the bulk solids handling industry for achieving even withdrawal (mass flow) over the cross section of a vessel, which will cause less disruption to the active smoldering front. The ability to vary the rotational speed of the auger provides a high degree of control over the rate of product withdrawal. The auger is actuated based on input from the thermocouples. Alternative configurations for achieving mass flow from the chamber include having multiple augers in the channel at the base of the funnel or eliminating the funnel and having what is known in the bulk solids handling industry as a "live bottom" at the base of the chamber, in which an array of augers in a horizontal plane is used to achieve mass flow, maintaining a stable and even smoldering front in the upper region of the vessel.

Combined Thermal Desorption with Smoldering

It has been discovered that by combining a thermal desorption process with a smoldering process, soil remediation as a whole can be greatly improved. As discussed above, thermal desorption typically has poorer performance for low-volatility and tightly-bound organic contaminants. Smoldering, while capable of oxidizing these contaminants, has drawbacks of its own, such as a minimum fuel content to sustain a combustion front, uneven front propagation and soil treatment, and low throughput. The present disclosure teaches that there are a number of efficiencies to be gained by incorporating a smoldering process to a thermal desorption process.

Figure 3:
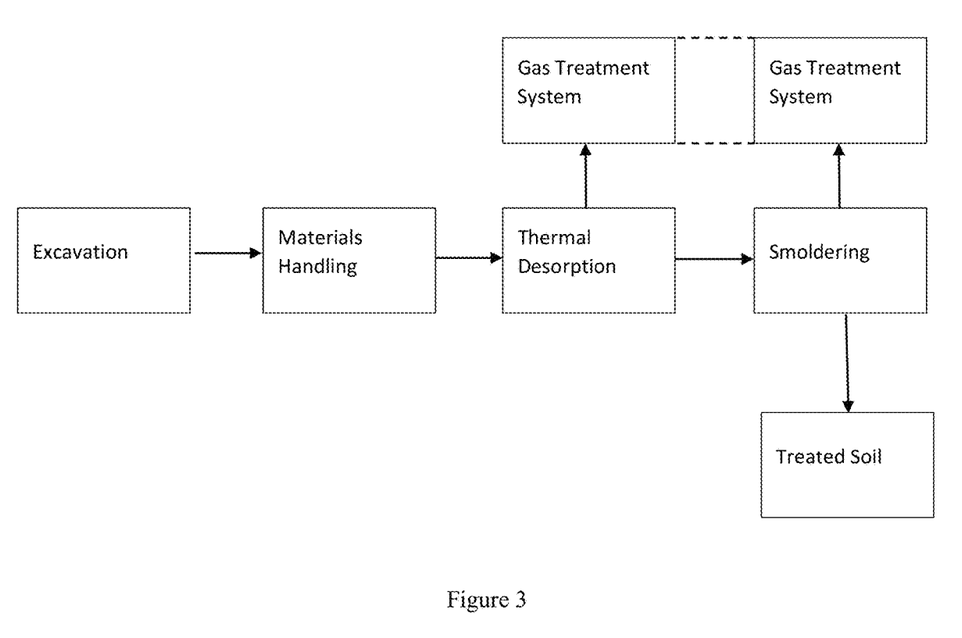
FIG. 3 is a block diagram of the currently disclosed process.

In one aspect, systems and methods for a combined thermal desorption with smoldering process are disclosed. For simplicity, Applicants describe the methods/processes but it is understood that such description is equally applicable to the systems. A block diagram of the general process is shown in FIG. 3. The process begins with excavation for the contaminated particulate material/soil from the site to be remediated. The soil can be pretreated by screening and shredding to remove rocks and break up larger clumps of soil. This is completed during the materials handling phase. The soil is then conveyed to a thermal desorber.

In one aspect, the thermal desorber is operated at a temperature above 150° C. and more commonly between 300 and 500° C. The thermal desorber oxygen concentration depending on fuel concentration may be as low as 18 vol %, as low as 16 vol %, as low as 14 vol %, as low as 12 vol %, or as low as 10 vol % or less. Within the thermal desorber, some organic contaminants are volatized and collected by gas treatment systems. The preceding thermal desorption process leaves the partially remediated soil dry and hot. Additionally, thermal desorption results in a pulverized, more homogeneous soil. The remaining partially remediated soil, which still contains low-volatility or tightly-bound organic contaminants, is then subjected to a smoldering process.

Typically ignition temperatures for organic contaminants in a smoldering process vary between 200 to 400° C. Thus, in one aspect, the partially remediated soil enters the smoldering process already above the ignition temperature for the organic contaminants. The smoldering is initiated when the hot, dry soil is introduced to a combustion-supporting gas, such as air. The combustion-supporting gas may contain more or less oxygen than air to raise or lower the rate of combustion and may be preheated to avoid cooling the soil bed or to provide supplemental heating to the soil bed.

Once the combustion-supporting gas is introduced, combustion reactions will begin to take place wherever the residual organic contaminants reside—that is, combustion/smoldering of the hydrocarbon contaminants is initiated throughout the smoldering unit at generally the same time (assuming a uniform distribution of the combustion-supporting gas). Thus, there is no need to propagate a high-temperature (>500° C.) combustion front. This has several previously undiscovered benefits. First, as discussed above, the smoldering process is allowed to occur at the temperature of the unit (e.g., 200 to 400° C.). The lower temperature results in a greater retention of native soil properties compared to conventional smoldering. Moreover, the homogeneity of the thermally desorbed soil facilitates distribution of the combustion-supporting gas and presents a much lower risk of uneven propagation of any combustion fronts that happen to develop. Because there is no need for a slow developing combustion front, the throughput concerns of smoldering processes are mitigated. In addition, the throughput of the thermal desorption process can be increased as shorter retention times are acceptable when residual organic contaminants are combusted in the smoldering process. It is therefore estimated that smoldering-aided thermal desorption will result in a similar or higher throughput compared to conventional thermal desorption processes. Finally, as this smoldering process is not required to be self-sustaining, there is no minimum soil fuel requirement (i.e., SST) as for conventional smoldering processes. After combustion, exhaust gases are sent to a gas treatment system, which may be the same or separate from the gas treatment system used for the thermal desorption portion of the process. Fully remediated soil is returned to its native location.

The following scenarios illustrate some applications of the remediation procedure using smoldering-aided thermal desorption.

Scenario 1: In the most basic embodiment, partially remediated particulate material from a thermal desorption process is submitted to a smoldering process. In the thermal desorption process, soil is partially remediated by separation of the more volatile organic contaminants. The partially remediated material is subsequently transported by conveyor or otherwise to a separate smoldering vessel. The smoldering process then completes the remediation by combusting the residual organic contaminants. Each portion of the system would perform similarly to systems described in FIGS. 1 and 2, with the exception that the smoldering process would have the efficiencies described above. To fully take advantage of these efficiencies, minor variations on the system in FIG. 2 would naturally include varying the position and number of spargers to improve the distribution of combustion-supporting gas.

Scenario 2: In another aspect, the system could include a conveyor along which partially remediated soil is transported from the thermal desorber and blown by a plurality of nozzles with combustion-supporting gas (e.g., air) to achieve smoldering. With the partially remediated soil already heated to ignition temperature by the thermal desorption process, blowing with combustion-supporting gas would initiate smoldering of the residual organic contaminants. An enclosure with suction over the conveyor would prevent dispersal of the soil to the surroundings and remove fine dust and off-gas for treatment. This embodiment is advantageous in that the conversion of a thermal desorption system is relatively straightforward and a high level of contact between the combustion-supporting gas and soil can be readily achieved in the smoldering process.

Scenario 3: In one aspect, two thermal desorbers are operated in series. The first desorber carries out a conventional thermal desorption treatment, transferring hot, dry soil with residual organic contaminants (e.g., low-volatility or tightly-bound contaminants) to the second desorber. The second desorber is operated with a combustion-supporting gas (e.g., air) to remove residual organic contaminants by smoldering combustion. The second desorber may utilize pressurized injection of the combustion-supporting gas to insure adequate contact with the hot soil. The second desorber may additionally be operated hot, to provide further heating (or reduce cooling) of the soil, or cold, in which case it is in essence a rotating drum or screw conveyor for providing contact between the combustion-supporting gas and soil. In another aspect, the functionality of the two desorbers is combined into a single desorber with separate zones for thermal desorption and smoldering processes. As soil is progressed through the desorber (e.g., a rotary drum), conditions transition gradually or abruptly to those more favorable to smoldering combustion and less favorable to thermal desorption. This transition could be achieved, for example, by a gradient in oxygen concentration or pressure. It may be desirable to provide suction in the thermal desorption zone, to remove desorbed organic contaminants, and to have pressurized injection of combustion-supporting gas in the smoldering zone, to facilitate contact between the combustion-supporting gas and hot soil. In still another aspect, the functionality of the two desorbers in series is replaced by a single desorber operated in batch mode. A first pass of a batch of soil through the desorber may be done as a conventional thermal desorption process. The hot, partially remediated soil is then fed through the desorber for a second pass, but with the desorber reconfigured to match the second (smoldering) desorber in the series configuration. Alternatively, the switch between thermal desorption and smoldering configurations may be made during the first pass of a batch of soil through the desorber (e.g., by pressurized injection of combustion-supporting gas), in which case a second pass may be unnecessary. This aspect is not as high in throughput as the preceding two due to its batch nature, but can be implemented at a lower cost and/or with reduced complexity.

Scenario 4: In another aspect, the system could include a fluidized bed reactor. Following a conventional thermal desorption process, soil with residual organic contaminants is transferred to a fluidized bed reactor for a smoldering combustion process. In this process, a typically preheated combustion-supporting gas (e.g., heated air) is injected at a flow rate sufficient to fluidize the soil in the reactor. Injection of combustion-supporting gas would generally occur near the base of a vertical reactor. The fluidization of the soil is greatly facilitated by the thermal desorption process, which removes moisture and pulverizes the soil. Residual organic contaminants associated with soil particles are combusted in the fluidized bed reactor during intimate mixing between hot soil and the fluidizing combustion-supporting gas. The fluidized bed reactor ideally operates in a continuous mode, with soil from the thermal desorption process being added and treated soil being withdrawn. Off-gas from the process containing entrained dust is removed for treatment. The fluidized bed reactor is advantageous because the mixing within the bed facilitates thorough, uniform treatment of the soil.

Additional Embodiments

Embodiment 1

A two-stage process for treating particulate materials containing organic contaminants comprising: removing an amount of contaminated particulate material from its location; transferring the contaminated particulate material to a thermal desorption unit; subjecting the contaminated particulate material to a thermal desorption process, wherein the thermal desorption process comprises; heating the contaminated particulate material to volatilize a portion of the organic contaminants and to form a preheated contaminated particulate material;

collecting the volatilized organic contaminants outside of the thermal desorption unit; transferring the preheated contaminated particulate material to a smoldering combustion unit; subjecting the preheated contaminated particulate material to a smoldering combustion process, wherein the smoldering combustion process comprises; admitting the preheated contaminated particulate material to a smoldering combustion unit having an inlet for a contaminated particulate material and an outlet for a treated particulate material to be withdrawn from the unit;

operating the smoldering combustion unit under conditions sufficient to ignite a smoldering combustion reaction, which creates gaseous combustion products; collecting the gaseous combustion products outside of the smoldering combustion unit; and withdrawing a treated particulate material from the outlet of the smoldering combustion unit.

Embodiment 2

The process of embodiment 1, wherein the particulate material comprises a soil, sediment or sludge.

Embodiment 3

The process of any of the previous embodiments, wherein the organic contaminants comprise hydrocarbon or chlorinated hydrocarbon.

Embodiment 4

The process of any of the previous embodiments, wherein the thermal desorption unit is operated at a temperature greater than 150° C.

Embodiment 5

The process of any of the previous embodiments, wherein the thermal desorption unit is operated at a temperature of 300 to 500° C.

Embodiment 6

The process of any of the previous embodiments, wherein the smoldering to combustion unit is operated at a temperature greater than 150° C.

Embodiment 7

The process of any of the previous embodiments, wherein the smoldering combustion unit is operated at a temperature of 200 to 400° C.

Embodiment 8

The process of any of the previous embodiments, wherein operating the smoldering combustion unit under conditions sufficient to ignite a smoldering combustion reaction includes blowing the particulate material with combustion-supporting gas.

Embodiment 9

The process of embodiment 8, wherein the combustion-supporting gas is air.

Embodiment 10

The process of embodiment 8 or 9, wherein the combustion-supporting gas is preheated.

Embodiment 11

The process of any of the previous embodiments, wherein the smoldering combustion unit is a continuous smoldering system comprising a vertically aligned vessel wherein particulate material predominantly flows from top to bottom, or wherein the smoldering combustion unit comprises an enclosed conveyor along which particulate material is blown by one or more nozzles supplied with combustion-supporting gas.

Embodiment 12

The process of any of the previous embodiments, wherein the smoldering combustion unit is a second thermal desorption unit.

Embodiment 13

The process of any of the previous embodiments, wherein the smoldering combustion unit utilizes pressurized injection of combustion-supporting gas.

Embodiment 14

The process of any of the previous embodiments, wherein the smoldering combustion unit is the same structure as the thermal desorption unit.

Embodiment 15

The process of embodiment 14, wherein at the conclusion of the thermal desorption process, the particulate material is introduced to combustion-supporting gas to initiate the smoldering combustion process.

Embodiment 16

The process of embodiment 15, wherein the combustion-supporting gas is introduced through pressurized injection.

Embodiment 17

The process of any of embodiments 14-16, wherein the thermal desorption unit contains a spatial transition from a thermal desorption process to a smoldering combustion process along a direction of bulk transport of the particulate material.

Embodiment 18

The process of any of embodiments 1-10, wherein the smoldering combustion unit is a fluidized bed reactor in which combustion-supporting gas fluidizes the particulate material.

Embodiment 19

A system for two-stage treating of particulate materials containing organic contaminants comprising: a thermal desorption unit; and a smoldering combustion unit operatively coupled to the thermal desorption unit; wherein the smoldering combustion unit comprises; an enclosed structure; one or more pressurized gas injectors supplied with a combustion-supporting gas; an inlet for a contaminated particulate material; an outlet for withdrawing a treated particulate material; and a connection for collecting an exhaust gas.

Embodiment 20

The system of embodiment 19, wherein the enclosed structure comprises a vertically aligned vessel wherein the contaminated particulate material predominantly flows from top to bottom.

Embodiment 21

The system of embodiment 19, wherein the enclosed structure comprises a conveyor.

Embodiment 22

The system of embodiment 19 or 21, wherein the enclosed structure is a second thermal desorption unit.

Embodiment 23

The system of embodiment 19 or 21, wherein the enclosed structure is the thermal desorption unit.

Embodiment 24

The system of embodiment 19, wherein the enclosed structure is a fluidized bed reactor in which the combustion-supporting gas fluidizes the particulate material.

The invention claimed is:

1. A two-stage process for treating particulate materials containing organic contaminants comprising:
 removing an amount of contaminated particulate material from a location;
 transferring the contaminated particulate material to a thermal desorption unit;
 subjecting the contaminated particulate material to a thermal desorption process, wherein the thermal desorption process includes heating the contaminated particulate material to volatilize a portion of the organic contaminants and to form a preheated contaminated particulate material, and collecting the volatilized organic contaminants outside of the thermal desorption unit;
 transferring the preheated contaminated particulate material to a smoldering combustion unit; and
 subjecting the preheated contaminated particulate material to a smoldering combustion process, wherein the smoldering combustion process includes admitting the preheated contaminated particulate material to the smoldering combustion unit having an inlet for the preheated contaminated particulate material and an outlet for a treated particulate material to be withdrawn from the smoldering combustion unit, operating the smoldering combustion unit under conditions sufficient to ignite a smoldering combustion reaction, which creates gaseous combustion products, collecting the gaseous combustion products outside of the smoldering combustion unit, and withdrawing a treated particulate material from the outlet of the smoldering combustion unit.

2. The process of claim 1, wherein the particulate material comprises a soil, sediment or sludge.

3. The process of claim 1, wherein the organic contaminants comprise hydrocarbon or chlorinated hydrocarbon.

4. The process of claim 1, wherein the thermal desorption unit is operated at a temperature greater than 150° C.

5. The process of claim 4, wherein the thermal desorption unit is operated at a temperature of 300 to 500° C.

6. The process of claim 1, wherein the smoldering combustion unit is operated at a temperature greater than 150° C.

7. The process of claim 6, wherein the smoldering combustion unit is operated at a temperature of 200 to 400° C.

8. The process of claim 1, wherein operating the smoldering combustion unit under conditions sufficient to ignite the smoldering combustion reaction includes blowing the preheated contaminated particulate material with combustion-supporting gas.

9. The process of claim 8, wherein the combustion-supporting gas is air.

10. The process of claim 8, wherein the combustion-supporting gas is preheated.

11. The process of claim 1, wherein the smoldering combustion unit is a continuous smoldering system comprising a vertically aligned vessel wherein the contaminated particulate material predominantly flows from top to bottom.

12. The process of claim 1, wherein the smoldering combustion unit comprises an enclosed conveyor along which the contaminated particulate material is blown by one or more nozzles supplied with combustion-supporting gas.

13. The process of claim 1, wherein the smoldering combustion unit is a second thermal desorption unit.

14. The process of claim 13, wherein the smoldering combustion unit utilizes pressurized injection of combustion-supporting gas.

15. The process of claim 1, wherein the smoldering combustion unit is the same structure as the thermal desorption unit.

16. The process of claim 15, wherein at the conclusion of the thermal desorption process, the preheated contaminated particulate material is introduced to combustion-supporting gas to initiate the smoldering combustion process.

17. The process of claim 16, wherein the combustion-supporting gas is introduced through pressurized injection.

18. The process of claim 15, wherein the thermal desorption unit contains a spatial transition from a thermal desorption process to a smoldering combustion process along a direction of bulk transport of the particulate material.

19. The process of claim 1, wherein the smoldering combustion unit is a fluidized bed reactor in which combustion-supporting gas fluidizes the contaminated particulate material.

\* \* \* \* \*